Nov. 24, 1959  L. WAGENSEIL  2,914,239
PROCESS AND APPARATUS FOR CONTROLLING MOTOR COMPRESSORS
Filed Oct. 19, 1955  4 Sheets-Sheet 1
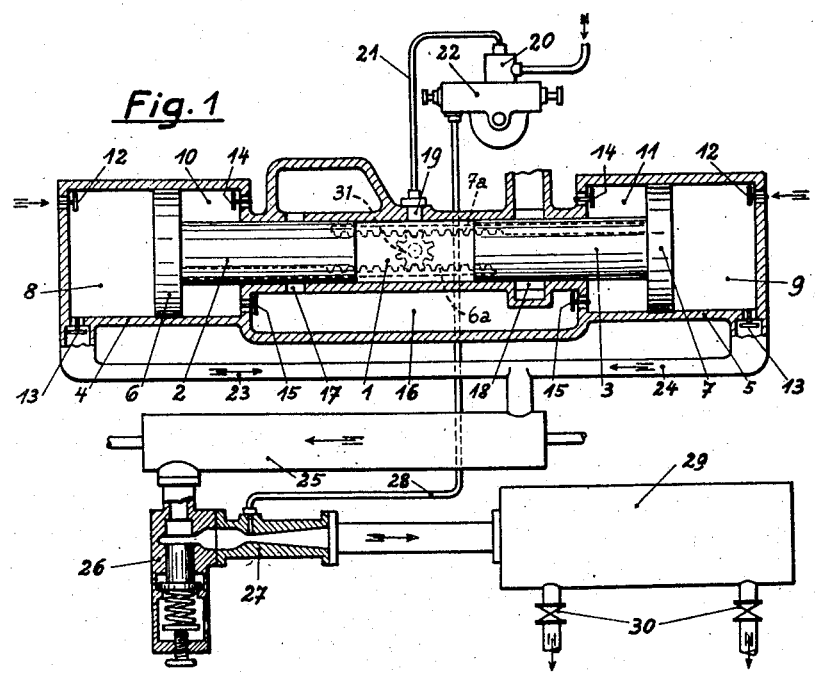
Fig. 1
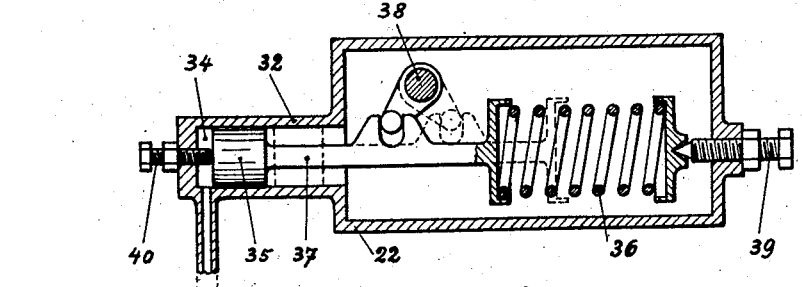
Fig. 2
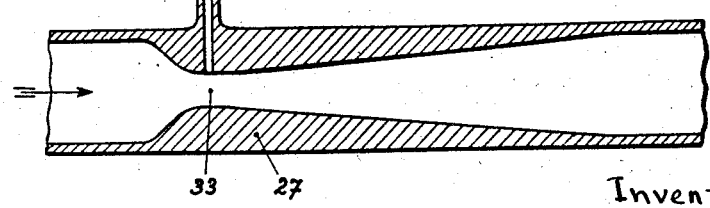
Inventor:
Ludwig Wagenseil
By:
Michael S. Striker
agt.

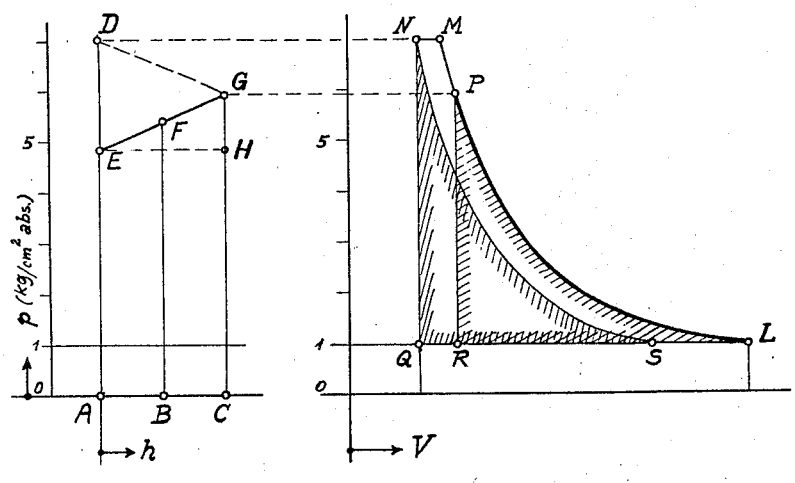
Fig. 3  Fig. 4
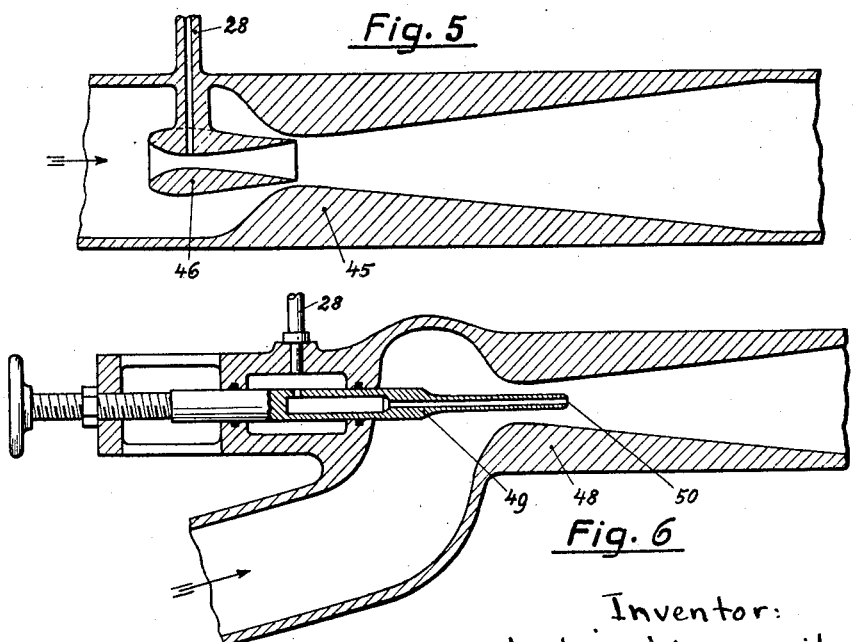
Fig. 5
Fig. 6

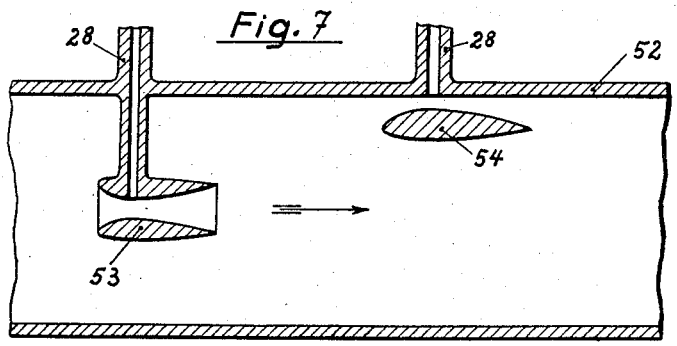
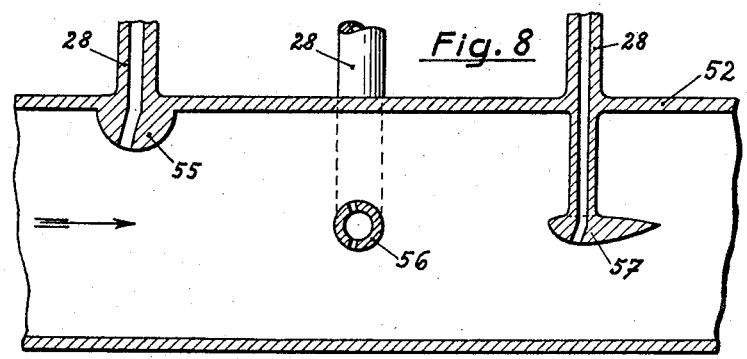
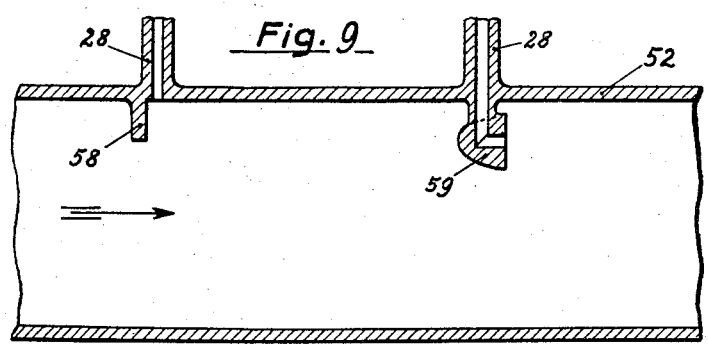

Nov. 24, 1959    L. WAGENSEIL    2,914,239
PROCESS AND APPARATUS FOR CONTROLLING MOTOR COMPRESSORS
Filed Oct. 19, 1955    4 Sheets-Sheet 4

Inventor:
Ludwig Wagenseil
By:
Michael S. Struker
agt.

United States Patent Office 2,914,239
Patented Nov. 24, 1959

2,914,239
PROCESS AND APPARATUS FOR CONTROLLING MOTOR COMPRESSORS

Ludwig Wagenseil, Munich-Obermenzing, Germany, assignor to Junkers Maschinen- und Metallbau G.m.b.H., Munich-Allach, Germany Application October 19, 1955, Serial No. 541,501

Claims priority, application Germany November 4, 1954

9 Claims. (Cl. 230—10)

The present invention relates to motor-compressors, especially to free piston motor compressors, which are adapted to provide compressed air, for example, and more particularly the present invention relates to a process and apparatus for controlling such a motor-compressor.

It is conventional to control the supply of fuel to the motor of a motor-compressor in such a way that as the pressure of the gas in a container supplied by the motor-compressor increases the supply of fuel to the motor decreases. This arrangement provides a relatively simple control of the operation of the motor-compressor, and this control is stable particularly because of the fact that the fuel supply is diminished as the pressure of the gas in the tank supplied by the motor-compressor increases.

In order to provide a sufficiently stable control it is essential that the gas pressure vary through a substantial range from the full load operating condition of the motor-compressor to the idling operating condition of the motor-compressor. For example, where the motor-compressor provides a gas having a pressure of 6 kg./cm.$^2$ at full load, it is of advantage to provide a range of 1 kg./cm$^2$ in the pressure of the gas in the container so that when the motor-compressor is idling the gas pressure in the container is approximately 7 kg./cm$^2$.

This latter arrangement necessarily requires the pressure of the gas supplied by the motor-compressor to depend upon the rate at which gas is taken from the container supplied with gas by the motor-compressor. Thus, when gas is taken at a high rate from this container the pressure of the gas supplied by the motor-compressor will be relatively low, and on the other hand when very little or no gas is taken from the container the pressure of the gas supplied to the container will be relatively high. This factor is in some cases undesirable, rather sometimes it will be desirable that the pressure of the gas supplied by the motor-compressor to the container remains at least approximately constant or even that this pressure decreases if the delivery of the motor-compressor diminishes.

One of the objects of the present invention is to provide a process and apparatus which will render the pressure of the gas supplied by the motor-compressor independent of the rate at which gas is removed from the container supplied by the motor-compressor.

Also, it is an object of the present invention to provide a means for rendering the pressure of the gas supplied to the container smaller when gas is taken from the container at a relatively slow rate than when it is taken at a relatively high rate. This latter arrangement is particularly desirable when part of the compressed gas is used to drive auxiliary devices such as cooling blowers and pumps, because then the pressure of the cooling medium is automatically controlled in accordance with the load conditions of the motor-compressor in such a way that the stream of cooling medium is strongest at full load and is smallest when the motor-compressor is idling, for example, when the gas taken from the container is zero.

A further object of the present invention is to control a free piston motor-compressor in such a way that the work required to return the movable masses of the motor-compressor from the end of the compression stroke of the compressor to the start of the compression stroke of the compressor remains at least substantially constant over the entire operating range of the motor-compressor. This latter feature is of particular significance because during the return stroke of the compressor masses the charge in the motor is compressed and the compression of this charge should remain uniform under all operating conditions. This latter result is obtained by maintaining the return work required to return the masses of the motor-compressor to the startr of the compression stroke of the compressor substantially constant at all operating ranges.

An additional object of the present invention is to provide a control whose stability is not dependent upon the increase in the pressure of the delivered gas when the gas consumption reduces. Instead it is an object of the present invention to be able to provide a pressure of the delivered gas which remains constant during a reduction in consumption of the compressed gas or which even becomes lower during a reduction in the consumption of the compressed gas.

Still another object of the present invention is to provide an exceedingly simple structure capable of producing the above objects.

Also, it is an object of the present invention to provide a stationary structure for producing a reduction in the static pressure in at least a part of the gas supplied by the motor-compressor.

Furthermore, the objects of the present invention include a means for adjusting a reduction in static pressure of a part of the gas supplied by the motor-compressor. Also, it is an object of the present invention to provide a reduction in the static pressure of at least a part of the gas supplied by the motor-compressor with a structure which reduces the cross section through which the gas supplied flows to a very small extent.

With the above objects in view the present invention mainly consists of a process for controlling a motor-compressor, this process including the steps of reducing the static pressure of at least a part of the gas supplied by the motor-compressor, and applying this reduced static pressure against a movable fuel supply control member which reduces the fuel supplied to the motor as the pressure acting on this member increases.

Also, with the above objects in view, the present invention mainly consists of an apparatus for controlling a motor-compressor, this apparatus including a chamber in which is movable a member for controlling the fuel supplied to the motor. A conduit carries the gas away from the motor-compressor, and a duct communicates with the conduit and with the chamber so that the movable control member in the chamber is under the influence of the gas in the conduit. At the place where this duct communicates with the conduit there is provided a means for reducing the static pressure of the gas which flows from the conduit through the duct to the chamber to act on the control member therein.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a diagrammatic partly sectional view of a free piston motor-compressor associated with a control structure according to the present invention;

Fig. 2 is a fragmentary sectional elevational view of one possible control structure according to the present invention;

Fig. 3 is a graph showing the relation between the pressure and the movement of the control member of the invention;

Fig. 4 is a graph illustrating the manner in which the return work is maintained constant in accordance with the present invention;

Fig. 5 is a fragmentary sectional elevational view of one possible structure for reducing the static pressure of part of the gas;

Fig. 6 is a fragmentary sectional elevational view of a structure for adjusting the extent to which the static pressure of a part of the gas is reduced;

Fig. 7 shows two possible structures for reducing static pressure;

Fig. 8 illustrates three different structures for reducing the static pressure;

Fig. 9 shows two more structures for reducing static pressure; and

Figure 10:
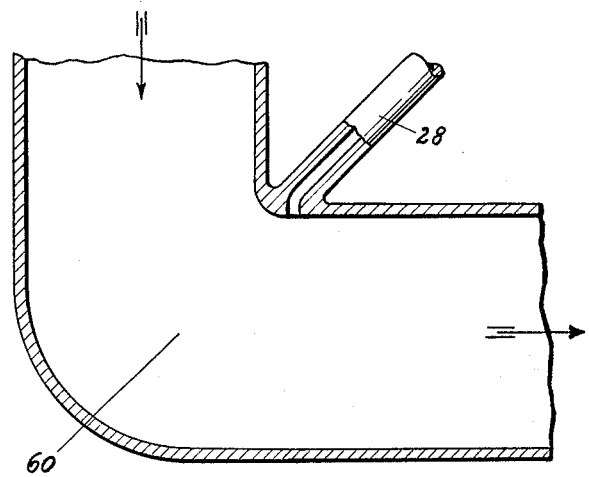
Fig. 10 shows still another structure for reducing static pressure in a gas flowing through a conduit.

Referring now to the drawings and to Fig. 1 in particular, the free piston motor-compressor diagrammatically illustrated therein includes a cylinder 1 in which a pair of floating pistons 2, 3 reciprocate. The floating motor pistons 2, 3 are respectively fixed to the compressor floating pistons 6, 7. The piston 6 reciprocates in a compressor cylinder 4 which is fixed to the cylinder 1, and the compressor piston 7 reciprocates in a compressor cylinder 5 which is fixed to the cylinder 1. In the cylinder 4 the chamber 8 at the left side of piston 6, as viewed in Fig. 1, is the compression chamber, while in the cylinder 5 the chamber 9 at the right side of the piston 7, as viewed in Fig. 1, is the compression chamber. Chambers 10, 11 of cylinders 4, 5, respectively, are scavenging chambers. The valves 12 are the inlet valves for the chambers 8, 9, while the valves 13 are the outlet valves for these chambers. The valves 14 are the inlet valves for the chambers 10, 11, while the valves 15 are the outlet valves for these chambers. The valves 12 and 14 provide communication between the cylinders 4, 5 and the outer atmosphere, while the valves 13 provide communication between the cylinders 4, 5 and the conduits 23, 24, respectively. The valves 15 provide communication between the chambers 10, 11 and the chamber 16 which communicates with cylinder 1 through the ports 17, these ports being inlet ports for the cylinder 1. This cylinder 1 is provided with outlet ports 18. An injection nozzle 19 supplies fuel to the interior of the chamber 1, and the nozzle 19 is provided with fuel by a fuel pump 20 which communicates with the injection nozzle 19 through a conduit 21. A fuel supply control device 22 is provided to control the amount of fuel supplied to the injection nozzle 19. The conduits 23, 24 direct the compressed gases to a cooler 25 from which the compressed gases flow through a valve 26 and a nozzle 27 to the container 29 from which the compressed gas is taken in a manner controlled by the valves 30. A duct 28 provides communication between a chamber of the fuel supply control 22 and the part of the conduit leading to container 29 where the nozzle in the form of the Venturi 27 is located.

The movable masses 2, 6 and 3, 7 of the motor-compressor are interconnected with each other in such a way that they are constrained to move through the same distances in opposite directions and at the same rates so that these masses are always at the same corresponding parts of the cycle of operations. The means for connecting the pistons 2, 6 and 3, 7 may include a pair of racks 6a, 7a respectively fixed to the pistons 6 and 7 extending in axial direction thereof and meshing with a pinion 31 at opposite sides of the latter. Pinion 31 is rotatably mounted in the motor cylinder 1. The drive which interconnects the masses 2, 6 and 3, 7 also serves to drive the fuel supply pump 20.

The valve 26 serves to maintain a minimum of pressure in the compressor outlet when starting and—with the compressor working—if the pressure in the container 29 drops below that minimum. In other words when the apparatus is started up, the valve 26 is closed until the masses of the motor-compressor move at a rate sufficient to maintain the minimum desired pressure in the container 29, and then the valve 26 automatically opens so that the gas flows to the container 29. If, for example, a conduit leading gas from container 29 should burst so that there would be a sudden drop in pressure, the valve 26 will automatically close. Thus, the pressure of the gas at the compressor outlet is maintained above a predetermined value by the valve 26 even if the rate of gas consumption is far greater than that for which the structure is designed. During normal operation which includes idling the valve 26 remains open at all times and has no influence on the control of the motor-compressor. It is therefore immaterial whether the nozzle 27 is located upstream or downstream of the valve 26. However, it is desirable to place between the outlet of the motor-compressor and the nozzle 27 a relatively large chamber such as the cooler 25 which serves to supply the nozzle 27 with a relatively constant gas stream even though the gas arrives in pulsations into the cooler 25.

As is apparent from Fig. 2, the nozzle 27 is in the form of a Venturi which has a relatively short well rounded entrance converging toward the throat 33 of the Venturi and which gradually diverges through a relatively long portion of the Venturi downstream of the throat 33, so that in this way the loss of pressure in the gas flowing through the Venturi is maintained very low.

The throat 33 of the conduit in which the Venturi 27 is located communicates through a duct 28 with a chamber 34 in which a movable control member 35 in the form of a piston sliable in the cylindrical chamber 34 is located. The movable control member 35 controls the fuel supply to the cylinder 1. The piston 35 is loaded by spring 36 so as to be urged to the left, as viewed in Fig. 2, against the adjustable stop 40. The spring 36 is located between a pair of plates one of which is fixed to a rod 37 which is in turn fixed to the piston 35, and the other of which may have its position in the cylinder 22 adjusted by the screw 39, as illustrated in Fig. 2. The rod 37 is provided with a notch into which extends a crank fixed to a fuel supply adjusting member 38, and the arrangement is such that as the parts 35, 37 shift to the right, as viewed in Fig. 2, to the dotted line position shown in Fig. 2 the amount of fuel supplied to the cylinder 1 is decreased. The chamber 34 is formed by a cylinder 32 which is fixed to the casing 22. The member 38 controls in a known way not forming part of the invention the amount of fuel supplied at each stroke of the motor to the cylinder 1. Thus, the maximum amount of fuel supplied to the motor is determined by the adjustable stop 40, and movement of the control member 35 away from the stop 40 reduces the amount of fuel supplied to the motor.

The operation of the structure of the invention is graphically illustrated in Fig. 3.

In Fig. 3 the movement of control member 35 to the right, as viewed in Fig. 2, is plotted along the abscissa, while the pressure of the gas supplied by the motor-compressor is indicated along the ordinate of Fig. 3. Point A corresponds to the stop position of the control member 35 where it engages the stop 40, and in this position of the control member the amount of fuel supplied to the motor is greatest and therefore the compressed air supply is also greatest at this point. Point C of Fig. 3 corresponds to the idling operating condition of the motor-compressor where the amount of fuel supplied is smallest and where no compressed air is supplied by the motor-compressor. Point B is an intermediate position of the control member 35.

When the motor-compressor is at rest atmospheric pressure prevails everywhere and therefore the control member 35 rests against the stop 40 under the influence of the spring 36, and therefore the injection pump 20 is adjusted for maximum supply.

When the motor-compressor is operating there is provided at the throat 33 of the Venturi 27 an increase in the speed of gas movement and as a result a reduction in the static pressure of the gas with respect to the pressure of the gas supplied by the motor-compressor.

If it is assumed that the pressure A—D is the pressure at which gas is supplied from the compressor as a maximum, and that D—E is the reduction in static pressure provided by the throat of the Venturi, then the pressure A—E represents the pressure which acts on the control member 35, this latter pressure being counter balanced by the spring 36.

If now the rate of consumption of compressed gas diminishes, then the speed of gas movement within the nozzle 27 also diminishes, and as a result the extent of the reduction in static pressure also diminishes. The result is therefore an increase in the pressure acting on the control member 35. The control member 35 thus moves away from the stop 40 (point A) and moves up to point B where the spring 36 also provides a counter balance between the new pressure B—F acting on the control member 35 and the spring 36. With this shifting of the control member 35, the member 38 is operated in such a way that the amount of fuel supplied to the engine is diminished, in a well known manner.

If now the consumption of compressed gas is reduced to zero, so that the engine idles, then there is no flow of gas through the nozzle 27, and as a result there is no reduction in static pressure and the full pressure of the gas in the container 29 acts on the control member 35 at this time, this pressure being indicated at C—G in Fig. 3. Thus, at this time the control member 35 has been shifted to the point C where only sufficient fuel is supplied to the motor to cause the same to idle when the pressure C—G prevails in the container 29. The magnitude of the pressure C—G is determined by the pressure of the spring 36 when the control member 35 is at the point C. The difference between the pressures C—G and A—E is indicated at G—H, and this difference represents the increase in the pressure which acts on the control member 35 over the entire range of movement of this control member, that is from the full load operation of the compressor to idling thereof.

It will be noted that this control of the present invention is stable because the medium which produces the control, that is, the pressure in the chamber 34 acting on the control member 35, is required to increase in pressure in order to produce a reduction in the medium to be controlled, that is, the fuel supplied to the engine. However, whereas with the conventional control arrangement described above the pressure of the gas at idling of the motor-compressor (point C) must be higher than the pressure at full load (point A) in order to provide stability, it is possible with the present invention to avoid this requirement. In fact, the pressure when the motor-compressor idles (indicated at C—G) is almost completely independent of the pressure at full load (indicated at A—D). The idling pressure can for example be made equal to the full load pressure, and under these circumstances the compressor operates over its entire operating range with a supply of gas at a practically uniform pressure. Furthermore, the idling pressure (represented by C—G) can, as indicated in Fig. 3, be smaller than the full load pressure, and this arrangement provides a great advantage, in that it is possible in this way to reduce the increase of return work which occurs with common free piston motor-compressors when the rate of gas consumption diminishes. Such an increase of return work is undesirable as it causes a higher compression of the air charge of the motor cylinder and hence higher stresses in said cylinder. In other words, it is possible with the present invention to maintain the return work substantially constant over the entire range of operation of the motor-compressor, and this feature is illustrated in Fig. 4.

Thus, referring to Fig. 4, the area LMNQL is the pressure-volume diagram of a single stage compressor under full load. The area NQSN between the expansion line NS and the atmosphere line QL represents the return work required to return the movable masses of the motor-compressor from the end of the compression stroke of the compressor to the start of this compression stroke. The supply pressure of the gas delivered by the motor-compressor to the container 29 is indicated at Q—N. The control is so designed that at idling of the compressor an end pressure RP is provided, and this end pressure is smaller than the supply pressure Q—N. Thus, the area PRLP represents the return work under idling conditions. Through proper choice of the position of the point P it is possible to make the area PRLP equal to the area NQSN, and in this way the return work can be maintained constant under all operating conditions.

A reduction in the pressure of the gas when the motor-compressor idles (indicated at R—P) as compared to the pressure of the gas at full load (indicated at Q—N) requires a particularly large reduction in the static pressure of the gas flowing through the conduit leading to the container 29 at full load. In the event that a simple Venturi will not suffice to produce the desired reduction in the pressure, then the arrangement shown in Fig. 5 may be used. According to Fig. 5 the Venturi 45, which corresponds to the Venturi 27, has a second Venturi 46 located in its interior portion in the manner shown in Fig. 5, so that the speed of the gas is increased beyond the speed increase provided by the Venturi 45 by the Venturi 46. At the throat of this Venturi 46 it communicates through the duct 28 with the working chamber 34 in which the control member 35 is located.

Fig. 6 shows an arrangement where the gas in the throat portion of the Venturi 48 communicates with the chamber 34 through a tube 49 which is shiftable axially along the Venturi 48. Thus, with the arrangement of Fig. 6 the gas flows to the container 29 along a conduit which includes the Venturi 48, and this conduit turnably supports the tube 49 along the axis of the Venturi 48. The tube 49 has a threaded portion threadedly supported in the manner shown in Fig. 6 so that the axial position of the tube 49 with respect to the Venturi 48 may be adjusted. The open end 50 of the tube 49 communicates with the interior of the Venturi 48, and the tube 49 passes through a sealed chamber which in turn communicates with the duct 28 leading to the chamber 34. As is indicated in Fig. 6 the left end portion of the interior of the tube 49 communicates through a suitable port with the chamber which communicates with the duct 28. Thus, with the arrangement of Fig. 6 it is possible to control the point of the Venturi 48 where the static pressure is taken to control the member 35.

Figs. 7–9 illustrate several different types of built-in members located in the conduit 52 leading to the container 29 for producing a reduction in the static pressure of a part of the gas flowing to the container 29. With all of the structures shown in Figs. 7–9 the cross sectional area of the conduit 52 through which the gas flows is reduced to only a very small extent and the static pressure is reduced only at a particular region of the conduit which communicates with the working chamber 34 through the duct 28.

Fig. 7 shows two members shaped in order to produce the desired results. Thus, the member 53 is in the form of a relatively small Venturi about which the gas in the conduit 52 may flow. The Venturi 53 communicates at its throat with the duct 28 in the manner shown at the left portion of Fig. 7. The member 54 as shown in Fig. 7 is another embodiment of a device for reducing static pressure. The member 54 has an airfoil cross section and is located in the conduit 52 adjacent an inner face thereof which communicates with the duct 28 so that with the arrangement shown at the right portion of Fig. 7 there will be a reduction in static pressure at the inlet to the duct 28. It will be noted that this result is obtained by locating a convex surface portion of member 54 adjacent an inner face of the conduit 52 where the duct 28 is located. In Fig. 8 there is shown a hemispherical projection 55 at an inner face of the conduit 52 which communicates with the conduit 28 in order to provide a localized reduction in static pressure of a part of the gas flowing through the conduit 52. At the central portion of Fig. 8 there is shown a cylinder 56 which extends across the conduit 52 and has a relatively small size as compared with the size of the conduit 52. This cylinder 56 communicates with the duct 28 leading to the working chamber 34, and suitable ports are provided in the cylinder 56 in the manner shown in Fig. 8 so that the static pressure reduction communicates through cylinder 56 with the duct 28. The right portion of Fig. 8 shows a body 57 also of airfoil cross section and having a small size with respect to the conduit 52 extending across the interior of the latter and communicating through a suitable passage with the duct 28, a reduction in static pressure also being produced by the member 57.

The two embodiments illustrated in Fig. 9 differs from the above described embodiments for producing a reduction in static pressure of a part of the gas flowing through the conduit 52, in that with the embodiments of Fig. 9 the members which produce the reduction in static pressure extend partly into the conduit 52 and are obstructions to the gas flow so that there is a reduction in pressure on the downstream side of these obstructions. Thus, the member 58 as shown in Fig. 9 is simply a relatively small wall extending transversely across a relatively small part of the conduit 52 so that on the downstream side of the wall 58 there is a reduction in pressure, and it will be noted that the duct 28 communicates with the conduit 52 just downstream of the obstruction 58. The obstruction 59 is located inwardly of the inner face of the conduit 52 and has a flat downstream face provided with a port communicating with the duct 28 in the manner shown in Fig. 9.

It will be noted that with all of the above described embodiments of the invention the duct 28 leading to the chamber 34 in which the control member 35 is located communicates with the conduit supplying the container 29 at a region where there is a very substantial reduction in pressure.

Still another means for reducing the static pressure of a part of the gas flowing to the container 29 is shown in Fig. 10 where this means takes the form of the conduit 60 which leads to the container 29 with the embodiment of Fig. 10. The pressure reduction means is formed by a sharp bend in the conduit 60 itself, and it will be noted that the inner face of the sharply curved part of the conduit 60 communicates with the duct 28 just downstream of the sharp bend in the conduit 60. In this very simple way it is also possible to obtain a very substantial reduction in static pressure of a part of the gas supplied to the container 29 by the motor-compressor.

The present invention is applicable to one or multiple stage compressors and also is applicable to those cases where the compressor supplies gases other than air.

It will be understood that each of the elements described above, or two or more together, may also find a useful application in other types of process and apparatus for controlling motor-compressors differing from the types described above.

While the invention has been illustrated and described as embodied in a process and apparatus for controlling the fuel supply of motor-compressors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A free piston motor-compressor comprising, in combination, a motor cylinder; at least one compressor cylinder; two free pistons respectively located in said motor cylinder and in said compressor cylinder; means connecting said pistons for simultaneous movement in the respective cylinders in axial direction thereof; adjustable supply means for supplying fuel to said motor cylinder; a delivery conduit connected to said compressor cylinder for the gases compressed therein; means in said conduit reducing the static pressure of the gases flowing therethrough as the speed of the gases flowing through said conduit increases; a chamber; a control member arranged movably in said chamber in opposite directions, said control member engaging with the outer periphery thereof, the inner surface of said chamber to define therewith a pressure chamber at one side of said control member; a duct connected at one end to said pressure chamber and at the other end to said conduit at a point thereof where the static pressure of the gases flowing through said conduit is reduced, so that gas flowing through said duct into said pressure chamber will exert upon said control member a pressure tending to move it in one direction, which pressure is decreased from the static pressure in the delivery conduit as the speed of the gas flow therethrough increases; spring means acting on said control member and permanently tending to move the same in a direction opposite to said one direction against the pressure in said pressure chamber; and actuating means connecting said control member to said adjustable fuel supply means in such a manner that movement of said control member in said one direction results in the reduction of the fuel supply and movement of said control member in said opposite direction results in increase of said fuel supply.

2. A free piston motor-compressor comprising, in combination, a motor cylinder; at least one compressor cylinder; two free pistons respectively located in said motor cylinder and in said compressor cylinder; means connecting said pistons for simultaneous movement in the respective cylinders in axial direction thereof; adjustable supply means for supplying fuel to said motor cylinder; a delivery conduit connected to said compressor cylinder for the gases compressed therein; means in said conduit reducing the static pressure of the gases flowing therethrough as the speed of the gases flowing through said conduit increases, said means being in the form of a nozzle in said delivery conduit and having an interior portion of a smaller cross-section than the remainder of the interior of said nozzle, said nozzle remaining stationary during operation of the motor compressor; a chamber; a control member arranged movably in said chamber in opposite directions, said control member engaging with the outer periphery thereof, the inner surface of said chamber to define therewith a pressure chamber at one side of said control member; a duct connected at one end to said pressure chamber and at the other end with said narrow cross-section of said nozzle where the static pressure of the gases flowing through said conduit is reduced, so that gas flowing through said duct into said pressure chamber will exert upon said control member a pressure tending to move it in one direction, which pressure is decreased from the static pressure in the delivery conduit as the speed of the gas flow therethrough increases; spring means acting on said control member and permanently tending to move the same in a direction opposite to said one direction against the pressure in said pressure chamber; and actuating means connecting said control member to said adjustable fuel supply means in such a manner that movement of said control member in said one direction results in the reduction of the fuel supply and movement of said control member in said opposite direction results in increase of said fuel supply.

3. A free piston motor-compressor comprising, in combination, a motor cylinder; at least one compressor cylinder; two free pistons respectively located in said motor cylinder and in said compressor cylinder; means connecting said pistons for simultaneous movement in the respective cylinders in axial direction thereof; adjustable supply means for supplying fuel to said motor cylinder; a delivery conduit connected to said compressor cylinder for the gases compressed therein; means in said conduit reducing the static pressure of the gases flowing therethrough as the speed of the gases flowing through said conduit increases, said means being in the form of a Venturi located in said delivery conduit; a chamber; a control member arranged movably in said chamber in opposite directions, said control member engaging with the outer periphery thereof, the inner surface of said chamber to define therewith a pressure chamber at one side of said control member; a duct connected at one end to said pressure chamber and at the other end with the throat of said Venturi where the static pressure of the gases flowing through said conduit is reduced, so that gas flowing through said duct into said pressure chamber will exert upon said control member a pressure tending to move it in one direction, which pressure is decreased from the static pressure in the delivery conduit as the speed of the gas flow therethrough increases; spring means acting on said control member and permanently tending to move the same in a direction opposite to said one direction against the pressure in said pressure chamber; and actuating means connecting said control member to said adjustable fuel supply means in such a manner that movement of said control member in said one direction results in the reduction of the fuel supply and movement of said control member in said opposite direction results in increase of said fuel supply.

4. A free piston motor-compressor comprising, in combination, a motor cylinder; at least one compressor cylinder; two free pistons respectively located in said motor cylinder and in said compressor cylinder; means connecting said pistons for simultaneous movement in the respective cylinders in axial direction thereof; adjustable supply means for supplying fuel to said motor cylinder; a delivery conduit connected to said compressor cylinder for the gases compressed therein; means in said conduit reducing the static pressure of the gases flowing therethrough as the speed of the gases flowing through said conduit increases, said means being in the form of a pair of Venturi portions located in said outlet conduit, one of which is smaller than and located within the other, said one Venturi producing an increase in the speed of gas movement beyond that produced by said other Venturi; a chamber; a control member arranged movably in said chamber in opposite directions, said control member engaging with the outer periphery thereof, the inner surface of said chamber to define therewith a pressure chamber at one side of said control member; a duct connected at one end to said pressure chamber and at the other end with the throat of said one Venturi where the static pressure of the gases flowing through said conduit is reduced, so that gas flowing through said duct into said pressure chamber will exert upon said control member a pressure tending to move it in one direction, which pressure is decreased from the static pressure in the delivery conduit as the speed of the gas flow therethrough increases; spring means acting on said control member and permanently tending to move the same in a direction opposite to said one direction against the pressure in said pressure chamber; and actuating means connecting said control member to said adjustable fuel supply means in such a manner that movement of said control member in said one direction results in the reduction of the fuel supply and movement of said control member in said opposite direction results in increase of said fuel supply.

5. A free piston motor-compressor comprisng, in combination, a motor cylinder; at least one compressor cylinder; two free pistons respectively located in said motor cylinder and in said compressor cylinder; means connecting said pistons for simultaneous movement in the respective cylinders in axial direction thereof; adjustable supply means for supplying fuel to said motor cylinder; a delivery conduit connected to said compressor cylinder for the gases compressed therein; means in said conduit reducing the static pressure of the gases flowing therethrough as the speed of the gases flowing through said conduit increases, said means being in the form of a Venturi located in said outlet conduit and including adjustable means cooperating with said Venturi for transmitting the gas pressure prevailing at a place chosen at will of the divergent part of the Venturi throat; a chamber; a control member arranged movably in said chamber in opposite directions, said control member engaging with the outer periphery thereof, the inner surface of said chamber to define therewith a pressure chamber at one side of said control member; a duct connected at one end to said pressure chamber and at the other end with said adjustable means where the static pressure of the gases flowing through said conduit is reduced, so that gas flowing through said duct into said pressure chamber will exert upon said control member a pressure tending to move it in one direction, which pressure is decreased from the static pressure in the delivery conduit as the speed of the gas flow therethrough increases; spring means acting on said control member and permanently tending to move the same in a direction opposite to said one direction against the pressure in said pressure chamber; and actuating means connecting said control member to said adjustable fuel supply means in such a manner that movement of said control member in said one direction results in the reduction of the fuel supply and movement of said control member in said opposite direction results in increase of said fuel supply.

6. A free piston motor-compressor comprising, in combination, a motor cylinder; at least one compressor cylinder; two free pistons respectively located in said motor cylinder and in said compressor cylinder; means connecting said pistons for simultaneous movement in the respective cylinders in axial direction thereof; adjustable supply means for supplying fuel to said motor cylinder; a delivery conduit connected to said compressor cylinder for the gases compressed therein; means in said conduit reducing the static pressure of the gases flowing therethrough as the speed of the gases flowing through said conduit increases, said means being in the form of a Venturi located in said conduit and including adjustable means cooperating with said Venturi for transmitting the gas pressure at a place chosen at will of the divergent part of the Venturi throat, said adjustable means being in the form of a tube axially adjustable along said Venturi and having an open end located in said throat of said Venturi; a chamber; a control member arranged movably in said chamber in opposite directions, said control member engaging with the outer periphery thereof, the inner surface of said chamber to define therewith a pressure chamber at one side of said control member; a duct connected at one end to said pressure chamber and at the other end with said tube where the static pressure of the gases flowing through said conduit is reduced, so that gas flowing through said duct into said pressure chamber will exert upon said control member a pressure tending to move it in one direction, which pressure is decreased from the static pressure in the delivery conduit as the speed of the gas flow therethrough increases; spring means acting on said control member and permanently tending to move the same in a direction opposite to said one direction against the pressure in said pressure chamber; and actuating means connecting said control member to said adjustable fuel supply means in such a manner that movement of said control member in said one direction results in the reduction of the fuel supply and movement of said control member in said opposite direction results in increase of said fuel supply.

7. A free piston motor-compressor comprising, in combination, a motor cylinder; at least one compressor cylinder; two free pistons respectively located in said motor cylinder and in said compressor cylinder; means connecting said pistons for simultaneous movement in the respective cylinders in axial direction thereof; adjustable supply means for supplying fuel to said motor cylinder; a delivery conduit connected to said compressor cylinder for the gases compressed therein; means in said conduit reducing the static pressure of the gases flowing therethrough as the speed of the gases flowing through said conduit increases, said means including a member in said outlet conduit which reduces the cross-section thereof to only a small extent and which has a shape which produces a reduction in the pressure at the region of said conduit where said member is located; a chamber; a control member arranged movably in said chamber in opposite directions, said control member engaging with the outer periphery thereof, the inner surface of said chamber to define therewith a pressure chamber at one side of said control member; a duct connected at one end to said pressure chamber and at the other end to said region of said conduit where the static pressure of the gases flowing through said conduit is reduced, so that gas flowing through said duct into said pressure chamber will exert upon said control member a pressure tending to move it in one direction, which pressure is decreased from the static pressure in the delivery conduit as the speed of the gas flow therethrough increases; spring means acting on said control member and permanently tending to move the same in a direction opposite to said one direction against the pressure in said pressure chamber; and actuating means connecting said control member to said adjustable fuel supply means in such a manner that movement of said control member in said one direction results in the reduction of the fuel supply and movement of said control member in said opposite direction results in increase of said fuel supply.

8. A free piston motor-compressor comprising, in combination, a motor cylinder; at least one compressor cylinder; two free pistons respectively located in said motor cylinder and in said compressor cylinder; means connecting said pistons for simultaneous movement in the respective cylinders in axial direction thereof; adjustable supply means for supplying fuel to said motor cylinder; a delivery conduit connected to said compressor cylinder for the gases compressed therein; means in said conduit reducing the static pressure of the gases flowing therethrough as the speed of the gases flowing through said conduit increases, said means including a member in said outlet conduit which reduces the cross-section thereof to only a small extent and which increases the speed of gas flow at a given region in said conduit; a chamber; a control member arranged movably in said chamber in opposite directions, said control member engaging with the outer periphery thereof, the inner surface of said chamber to define therewith a pressure chamber at one side of said control member; a duct connected at one end to said pressure chamber and at the other end with said region of said conduit in which the speed of the gas flow is increased where the static pressure of the gases flowing through said conduit is reduced, so that gas flowing through said duct into said pressure chamber will exert upon said control member a pressure tending to move it in one direction, which pressure is decreased from the static pressure in the delivery conduit as the speed of the gas flow therethrough increases; spring means acting on said control member and permanently tending to move the same in a direction opposite to said one direction against the pressure in said pressure chamber; and actuating means connecting said control member to said adjustable fuel supply means in such a manner that movement of said control member in said one direction results in the reduction of the fuel supply and movement of said control member in said opposite direction results in increase of said fuel supply.

9. A free piston motor-compressor comprising, in combination, a motor cylinder; at least one compressor cylinder; two free pistons respectively located in said motor cylinder and in said compressor cylinder; means connecting said pistons for simultaneous movement in the respective cylinders in axial direction thereof; adjustable supply means for supplying fuel to said motor cylinder; a delivery conduit connected to said compressor cylinder for the gases compressed therein; means in said conduit reducing the static pressure of the gases flowing therethrough as the speed of the gases flowing through said conduit increases, said means being in the form of a Venturi nozzle located in said conduit, the cross-sectional area of said Venturi nozzle being only a fraction of the cross-sectional area of said conduit in which said Venturi nozzle is located; a chamber; a control member arranged movably in said chamber in opposite directions, said control member engaging with the outer periphery thereof, the inner surface of said chamber to define therewith a pressure chamber at one side of said control member; a duct connected at one end to said pressure chamber and at the other end with said throat of said Venturi where the static pressure of the gases flowing through said conduit is reduced, so that gas flowing through said duct into said pressure chamber will exert upon said control member a pressure tending to move it in one direction, which pressure is decreased from the static pressure in the delivery conduit as the speed of the gas flow therethrough increases; spring means acting on said control member and permanently tending to move the same in a direction opposite to said one direction against the pressure in said pressure chamber; and actuating means connecting said control member to said adjustable fuel supply means in such a manner that movement of said control member in said one direction results in the reduction of the fuel supply and movement of said control member in said opposite direction results in increase of said fuel supply.

References Cited in the file of this patent

UNITED STATES PATENTS

| | | |
|---|---|---|
| 1,129,009 | Petermoller | Feb. 16, 1915 |
| 1,383,258 | Hoffman | June 28, 1921 |
| 1,419,316 | Sherbondy | June 13, 1922 |
| 1,655,683 | Standerwick | Jan. 10, 1928 |
| 2,064,976 | Janicke | Dec. 22, 1936 |
| 2,246,701 | Steiner | June 24, 1941 |
| 2,467,513 | Welsh | Apr. 19, 1949 |
| 2,653,753 | Davey | Sept. 29, 1953 |